United States Patent
Pitt et al.

(10) Patent No.: US 7,489,273 B2
(45) Date of Patent: Feb. 10, 2009

(54) CULLED SATELLITE EPHEMERIS INFORMATION FOR QUICK, ACCURATE ASSISTED LOCATING SATELLITE LOCATION DETERMINATION FOR CELL SITE ANTENNAS

(75) Inventors: Lance Douglas Pitt, Seattle, WA (US); Leslie Johann Lamprecht, Seattle, WA (US); Jeffrey Thomas Martin, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 11/826,121

(22) Filed: Jul. 12, 2007

(65) Prior Publication Data
US 2009/0015469 A1    Jan. 15, 2009

Related U.S. Application Data

(63) Continuation of application No. 11/503,272, filed on Aug. 14, 2006, now abandoned, which is a continuation of application No. 11/342,837, filed on Jan. 31, 2006, now Pat. No. 7,113,128, which is a continuation of application No. 11/080,518, filed on Mar. 16, 2005, now Pat. No. 7,019,690.

(60) Provisional application No. 60/618,606, filed on Oct. 15, 2004.

(51) Int. Cl.
H04B 7/185    (2006.01)

(52) U.S. Cl. .............................. 342/357.15; 342/357.09

(58) Field of Classification Search ............ 342/357.16, 342/357.09
See application file for complete search history.

(56) References Cited

U.S. PATENT DOCUMENTS

| 4,445,118 | A | 4/1984 | Taylor et al. |
|---|---|---|---|
| 4,928,107 | A | 5/1990 | Kuroda |
| 4,972,484 | A | 11/1990 | Theile et al. |
| 5,126,722 | A | 6/1992 | Kamis |
| 5,283,570 | A | 2/1994 | DeLucca |
| 5,301,354 | A | 4/1994 | Schendeman et al. |
| 5,311,516 | A | 5/1994 | Kuznicki |
| 5,327,529 | A | 7/1994 | Fults et al. |
| 5,335,246 | A | 8/1994 | Yokev |
| 5,351,235 | A | 9/1994 | Lahtinen |

(Continued)

OTHER PUBLICATIONS

U.S. Appl. No. 09/539,495, filed Mar. 2000, Abrol.

*Primary Examiner*—Thomas H Tarcza
*Assistant Examiner*—Fred H Mull
(74) *Attorney, Agent, or Firm*—William H. Bollman

(57) ABSTRACT

Locating satellites (e.g., GPS) are culled into a preferred group having a longest dwell time based on a time passing through an ellipsoid arc path through a cone of space, and communicated to mobile devices within a particular region (e.g., serviced by a particular base station). The culled locating satellites may select those visible, or more preferably those locating satellites currently within a cone of space above the relevant base station are selected for communication by a mobile device within the service area of the base station. The inverted cone of space may be defined for each antenna structure for any given base station, and each has 360 degrees of coverage, or less than 360 degrees of coverage, with relevant locating satellites. Thus, cell sites may be specifically used as reference points for culling the ephemeris information used to expedite Assisted GPS location determinations.

27 Claims, 14 Drawing Sheets

U.S. PATENT DOCUMENTS

| | | |
|---|---|---|
| 5,365,451 A | 11/1994 | Wang et al. |
| 5,418,537 A | 5/1995 | Bird |
| 5,422,813 A | 6/1995 | Schuman |
| 5,479,408 A | 12/1995 | Will |
| 5,485,163 A | 1/1996 | Singer |
| 5,504,491 A | 4/1996 | Chapman |
| 5,506,886 A | 4/1996 | Maine |
| 5,517,199 A | 5/1996 | Di Mattei |
| 5,530,655 A | 6/1996 | Lokhoff et al. |
| 5,530,914 A | 6/1996 | McPheters |
| 5,539,395 A | 7/1996 | Buss et al. |
| 5,539,829 A | 7/1996 | Lokhoff et al. |
| 5,546,445 A | 8/1996 | Dennison |
| 5,568,153 A | 10/1996 | Beliveau |
| 5,583,774 A | 12/1996 | Diesel |
| 5,587,201 A | 12/1996 | Rho et al. |
| 5,594,780 A | 1/1997 | Wiedman et al. |
| 5,606,618 A | 2/1997 | Lokhoff et al. |
| 5,629,693 A | 5/1997 | Janky |
| 5,636,276 A | 6/1997 | Brugger |
| 5,661,652 A | 8/1997 | Sprague et al. |
| 5,661,755 A | 8/1997 | Van De Kerkhof et al. |
| 5,689,245 A | 11/1997 | Noreen et al. |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Leemelson et al. |
| 5,765,152 A | 6/1998 | Erickson |
| 5,771,353 A | 6/1998 | Eggleston |
| 5,774,670 A | 6/1998 | Muntulli |
| 5,809,415 A | 9/1998 | Rossmann |
| 5,812,086 A | 9/1998 | Bertiger et al. |
| 5,812,087 A | 9/1998 | Krasner |
| 5,841,396 A | 11/1998 | Kransner |
| 5,864,667 A | 1/1999 | Barkan |
| 5,874,914 A | 2/1999 | Krasner |
| 5,896,369 A | 4/1999 | Warsta |
| 5,922,074 A | 7/1999 | Richard et al. |
| 5,930,250 A | 7/1999 | Klok |
| 5,945,944 A | 8/1999 | Kraser |
| 5,946,629 A | 8/1999 | Sawyer |
| 5,950,137 A | 9/1999 | Kim |
| 5,960,362 A | 9/1999 | Grob |
| 5,983,099 A | 11/1999 | Yao et al. |
| 5,999,124 A | 12/1999 | Sheynblat |
| 6,032,051 A | 2/2000 | Hall et al. |
| 6,052,081 A | 4/2000 | Krasner |
| 6,058,338 A | 5/2000 | Agashe et al. |
| 6,061,018 A | 5/2000 | Sheynblat |
| 6,064,336 A | 5/2000 | Krasner |
| 6,067,045 A | 5/2000 | Castelloe et al. |
| 6,067,145 A | 5/2000 | Jung |
| 6,081,229 A | 6/2000 | Soliman |
| 6,085,320 A | 7/2000 | Kaliski, Jr. |
| 6,121,923 A | 9/2000 | King |
| 6,124,810 A | 9/2000 | Segal et al. |
| 6,131,067 A | 10/2000 | Girerd |
| 6,133,874 A | 10/2000 | Krasner |
| 6,134,483 A | 10/2000 | Vayanos et al. |
| 6,147,598 A | 11/2000 | Murphy |
| 6,150,980 A | 11/2000 | Krasner |
| 6,154,172 A | 11/2000 | Piccionelli et al. |
| 6,169,901 B1 | 1/2001 | Bourcher |
| 6,169,902 B1 | 1/2001 | Kawamoto |
| 6,178,506 B1 | 1/2001 | Quick, Jr. |
| 6,185,427 B1 | 2/2001 | Krasner |
| 6,188,354 B1 | 2/2001 | Soliman et al. |
| 6,188,909 B1 | 2/2001 | Alanara |
| 6,189,089 B1 | 2/2001 | Walker et al. |
| 6,195,557 B1 | 2/2001 | Havinis |
| 6,205,330 B1 | 3/2001 | Windbladh |
| 6,208,290 B1 | 3/2001 | Krasner |
| 6,215,441 B1 | 4/2001 | Moeglein |
| 6,239,742 B1 | 5/2001 | Krasner |
| 6,247,135 B1 | 6/2001 | Feague |
| 6,249,783 B1 | 6/2001 | Crone et al. |
| 6,253,203 B1 | 6/2001 | O'Flaherty et al. |
| 6,260,147 B1 | 7/2001 | Quick, Jr. |
| 6,275,692 B1 | 8/2001 | Skog |
| 6,275,849 B1 | 8/2001 | Ludwig |
| 6,278,701 B1 | 8/2001 | Ayyagari |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat et al. |
| 6,321,250 B1 | 11/2001 | Knape |
| 6,321,257 B1 | 11/2001 | Kotola |
| 6,324,542 B1 | 11/2001 | Wright, Jr. |
| 6,327,473 B1 | 12/2001 | Soliman et al. |
| 6,333,919 B2 | 12/2001 | Gafney |
| 6,873,854 B2 | 2/2002 | Crockett |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,430,504 B1 | 8/2002 | Gilbert et al. |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar et al. |
| 6,463,272 B1 | 10/2002 | Wallace et al. |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,466 B2 | 2/2003 | Pande et al. |
| 6,522,682 B1 | 2/2003 | Kohli et al. |
| 6,525,687 B2 | 2/2003 | Roy et al. |
| 6,525,688 B2 | 2/2003 | Chou et al. |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol et al. |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong et al. |
| 6,560,534 B2 | 5/2003 | Abraham et al. |
| 6,567,035 B1 | 5/2003 | Elliott |
| 6,570,530 B2 | 5/2003 | Gaal et al. |
| 6,574,558 B2 | 6/2003 | Kohli |
| 6,580,390 B1 | 6/2003 | Hay |
| 6,584,552 B2 | 6/2003 | Kuno |
| 6,594,500 B2 | 7/2003 | Bender et al. |
| 6,597,311 B2 | 7/2003 | Sheynblat et al. |
| 6,603,973 B1 | 8/2003 | Foladare et al. |
| 6,606,495 B1 | 8/2003 | Korpi et al. |
| 6,606,554 B2 | 8/2003 | Edge |
| 6,609,004 B1 | 8/2003 | Morse et al. |
| 6,611,757 B2 | 8/2003 | Brodie |
| 6,618,670 B1 | 9/2003 | Chansarkar |
| 6,621,452 B2 | 9/2003 | Knockeart et al. |

| Patent | Type | Date | Inventor |
|---|---|---|---|
| 6,628,233 | B2 | 9/2003 | Knockeart et al. |
| 6,630,093 | B1 | 10/2003 | Jones |
| 6,633,255 | B2 | 10/2003 | Krasner |
| 6,640,184 | B1 | 10/2003 | Rabe |
| 6,650,288 | B1 | 11/2003 | Pitt et al. |
| 6,661,372 | B1 | 12/2003 | Girerd |
| 6,665,539 | B2 | 12/2003 | Sih et al. |
| 6,665,541 | B1 | 12/2003 | Krasner et al. |
| 6,671,620 | B1 | 12/2003 | Garin et al. |
| 6,677,894 | B2 | 1/2004 | Sheynblat et al. |
| 6,680,694 | B1 | 1/2004 | Knockeart et al. |
| 6,680,695 | B2 | 1/2004 | Turetzky et al. |
| 6,694,258 | B2 | 2/2004 | Johnson et al. |
| 6,697,629 | B1 | 2/2004 | Grilli et al. |
| 6,701,144 | B2 | 3/2004 | Kirbas et al. |
| 6,703,971 | B2 | 3/2004 | Pande et al. |
| 6,703,972 | B2 | 3/2004 | van Diggelmen |
| 6,704,651 | B2 | 3/2004 | van Diggelmen |
| 6,707,421 | B1 | 3/2004 | Drury et al. |
| 6,714,793 | B1 | 3/2004 | Carey et al. |
| 6,718,174 | B2 | 4/2004 | Vayanos |
| 6,720,915 | B2 | 4/2004 | Sheynblat |
| 6,721,578 | B2 | 4/2004 | Minear et al. |
| 6,721,871 | B2 | 4/2004 | Piispanen |
| 6,724,342 | B2 | 4/2004 | Bloebaum et al. |
| 6,725,159 | B2 | 4/2004 | Krasner |
| 6,728,701 | B1 | 4/2004 | Stoica |
| 6,731,940 | B1 | 5/2004 | Nagendran |
| 6,734,821 | B2 | 5/2004 | van Diggelen |
| 6,738,013 | B2 | 5/2004 | Orler |
| 6,738,800 | B1 | 5/2004 | Aquilon |
| 6,741,842 | B2 | 5/2004 | Goldberg et al. |
| 6,745,038 | B2 | 6/2004 | Callaway |
| 6,747,596 | B2 | 6/2004 | Orler |
| 6,748,195 | B1 | 6/2004 | Philips |
| 6,751,464 | B1 | 6/2004 | Burg et al. |
| 6,756,938 | B2 | 6/2004 | Zhao et al. |
| 6,757,544 | B2 | 6/2004 | Rangarajan et al. |
| 6,772,340 | B1 | 8/2004 | Peinado |
| 6,775,655 | B1 | 8/2004 | Peinado |
| 6,775,802 | B2 | 8/2004 | Gaal |
| 6,778,136 | B2 | 8/2004 | Groneneyer |
| 6,778,885 | B2 | 8/2004 | Agashe et al. |
| 6,781,963 | B2 | 8/2004 | Crockett |
| 6,788,249 | B1 | 9/2004 | Farmer et al. |
| 6,795,699 | B1 | 9/2004 | McCraw et al. |
| 6,799,050 | B1 | 9/2004 | Krasner |
| 6,801,124 | B2 | 10/2004 | Naitou |
| 6,801,159 | B2 | 10/2004 | Swope et al. |
| 6,804,524 | B1 | 10/2004 | Vandermeijjden |
| 6,808,534 | B1 | 10/2004 | Escano |
| 6,810,323 | B1 | 10/2004 | Bullock et al. |
| 6,813,560 | B2 | 11/2004 | van Diggelen |
| 6,816,111 | B2 | 11/2004 | Krasner |
| 6,816,710 | B2 | 11/2004 | Krasner |
| 6,816,719 | B1 | 11/2004 | Heinonen |
| 6,816,734 | B2 | 11/2004 | Wong et al. |
| 6,820,069 | B1 | 11/2004 | Kogan et al. |
| 6,829,475 | B1 | 12/2004 | Lee et al. |
| 6,832,373 | B2 | 12/2004 | O'Neil |
| 6,833,785 | B2 | 12/2004 | Brown et al. |
| 6,839,020 | B2 | 1/2005 | Geir et al. |
| 6,839,021 | B2 | 1/2005 | Sheynblat et al. |
| 6,842,715 | B1 | 1/2005 | Gaal |
| 6,853,916 | B2 | 2/2005 | Fuchs et al. |
| 6,856,282 | B2 | 2/2005 | Mauro et al. |
| 6,861,980 | B1 | 3/2005 | Rowitch et al. |
| 6,865,171 | B1 | 3/2005 | Nilsson |
| 6,865,395 | B2 | 3/2005 | Riley |
| 6,867,734 | B2 | 3/2005 | Voor |
| 6,885,940 | B2 | 4/2005 | Brodie et al. |
| 6,888,497 | B2 | 5/2005 | King et al. |
| 6,888,932 | B2 | 5/2005 | Snip |
| 6,895,238 | B2 | 5/2005 | Newell et al. |
| 6,895,249 | B2 | 5/2005 | Gaal |
| 6,900,758 | B1 | 5/2005 | Mann et al. |
| 6,903,684 | B1 | 6/2005 | Simic et al. |
| 6,904,029 | B2 | 6/2005 | Fors et al. |
| 6,907,224 | B2 | 6/2005 | Younis |
| 6,907,238 | B2 | 6/2005 | Leung |
| 6,912,395 | B2 | 6/2005 | Benes et al. |
| 6,915,208 | B2 | 7/2005 | Garin et al. |
| 6,917,331 | B2 | 7/2005 | Groneneyer |
| 6,930,634 | B2 | 8/2005 | Peng et al. |
| 6,937,187 | B2 | 8/2005 | van Diggelen |
| 6,937,872 | B2 | 8/2005 | Krasner |
| 6,941,144 | B2 | 9/2005 | Stein |
| 6,944,540 | B2 | 9/2005 | King et al. |
| 6,947,772 | B2 | 9/2005 | Minear et al. |
| 6,950,058 | B1 | 9/2005 | Davis et al. |
| 6,956,467 | B1 | 10/2005 | Mercado, Jr. |
| 6,957,073 | B2 | 10/2005 | Bye |
| 6,961,019 | B1 | 11/2005 | McConnell et al. |
| 6,961,562 | B2 | 11/2005 | Ross |
| 6,965,754 | B2 | 11/2005 | King |
| 6,965,767 | B2 | 11/2005 | Maggenti |
| 6,968,195 | B2 | 11/2005 | Nowak |
| 6,970,917 | B1 | 11/2005 | Kushwaha |
| 6,973,166 | B1 | 12/2005 | Tsumpes |
| 6,973,320 | B2 | 12/2005 | Brown et al. |
| 6,975,266 | B2 | 12/2005 | Abraham et al. |
| 6,978,453 | B2 | 12/2005 | Rao |
| 6,980,816 | B2 | 12/2005 | Rohles |
| 6,985,105 | B1 | 1/2006 | Pitt |
| 6,996,720 | B1 | 2/2006 | DeMello |
| 6,999,782 | B2 | 2/2006 | Shaughnessy |
| 7,024,321 | B1 | 4/2006 | Deninger et al. |
| 7,024,393 | B1 | 4/2006 | Peinado |
| 7,047,411 | B1 | 5/2006 | DeMello |
| 7,064,656 | B2 | 6/2006 | Belcher et al. |
| 7,065,351 | B2 | 6/2006 | Carter et al. |
| 7,065,507 | B2 | 6/2006 | Momammed |
| 7,071,814 | B1 | 7/2006 | Schorman |
| 7,079,857 | B2 | 7/2006 | Maggenti |
| 7,103,018 | B1 | 9/2006 | Hansen |
| 7,103,574 | B1 | 9/2006 | Peinado |
| 7,106,717 | B2 | 9/2006 | Rousseau |
| 7,136,838 | B1 | 11/2006 | Peinado |
| 7,151,946 | B2 | 12/2006 | Maggenti |
| 7,177,623 | B2 | 2/2007 | Baldwin |
| 7,209,969 | B2 | 4/2007 | Lahti |
| 7,218,940 | B2 | 5/2007 | Niemenmaa |
| 7,221,959 | B2 | 5/2007 | Lindqvist et al. |
| 2001/0011247 | A1 | 8/2001 | O'Flaherty |
| 2002/0037735 | A1 | 3/2002 | Maggenti |
| 2002/0052214 | A1 | 5/2002 | Maggenti |
| 2002/0061760 | A1 | 5/2002 | Maggenti |
| 2002/0069259 | A1 | 6/2002 | Kushwaha |
| 2002/0102999 | A1 | 8/2002 | Maggenti |
| 2002/0112047 | A1 | 8/2002 | Kushwaha |
| 2002/0198632 | A1 | 12/2002 | Breed et al. |
| 2003/0009602 | A1 | 1/2003 | Jacobs |
| 2003/0037163 | A1 | 2/2003 | Kitada et al. |
| 2003/0065788 | A1 | 4/2003 | Salomaki |
| 2003/0078064 | A1 | 4/2003 | Chan |
| 2003/0078886 | A1 | 4/2003 | Minear |
| 2003/0081557 | A1 | 5/2003 | Mettala |
| 2003/0101329 | A1 | 5/2003 | Lahti |
| 2003/0101341 | A1 | 5/2003 | Kettler et al. |
| 2003/0103484 | A1 | 6/2003 | Oommen et al. |
| 2003/0114148 | A1 | 6/2003 | Albertson |
| 2003/0114157 | A1 | 6/2003 | Spitz et al. |
| 2003/0119528 | A1 | 6/2003 | Pew et al. |
| 2003/0153340 | A1 | 8/2003 | Crockett |
| 2003/0153341 | A1 | 8/2003 | Crockett |
| 2003/0153342 | A1 | 8/2003 | Crockett |

| | | |
|---|---|---|
| 2003/0153343 A1 | 8/2003 | Crockett |
| 2003/0161298 A1 | 8/2003 | Bergman |
| 2003/0204640 A1 | 10/2003 | Sahinoja |
| 2003/0223381 A1 | 12/2003 | Schrodens |
| 2004/0002326 A1 | 1/2004 | Maher |
| 2004/0044623 A1 | 3/2004 | Wake |
| 2004/0064550 A1 | 4/2004 | Sakata et al. |
| 2004/0068724 A1 | 4/2004 | Gardner |
| 2004/0090121 A1 | 5/2004 | Simmonds et al. |
| 2004/0178139 A1 | 9/2004 | Suh et al. |
| 2004/0204806 A1 | 10/2004 | Chen et al. |
| 2004/0205151 A1 | 10/2004 | Sprigg |
| 2004/0229632 A1 | 11/2004 | Flynn |
| 2005/0003797 A1 | 1/2005 | Baldwin |
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gaus |
| 2005/0136895 A1 | 6/2005 | Thenthiruperai |
| 2005/0172217 A1 | 8/2005 | Leung |
| 2005/0174987 A1 | 8/2005 | Raghav |
| 2005/0209995 A1 | 9/2005 | Aksu |
| 2005/0246217 A1 | 11/2005 | Horn |
| 2005/0259675 A1 | 11/2005 | Tuohino et al. |
| 2006/0053225 A1 | 3/2006 | Poikselka |
| 2006/0058045 A1 | 3/2006 | Nilsen |
| 2006/0074618 A1 | 4/2006 | Miller |
| 2006/0090136 A1 | 4/2006 | Miller |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Fok |
| 2007/0026854 A1 | 2/2007 | Nash |
| 2007/0030539 A1 | 2/2007 | Nath |
| 2007/0030973 A1 | 2/2007 | Mikan |

| GPS SATELLITE ID | VISIBLE | CULLED, PREFERRED |
|---|---|---|
| SAT. # 1 | | |
| SAT. # 2 | | |
| SAT. # 3 | | |
| SAT. # 4 | | |
| SAT. # 5 | | |
| SAT. # 6 | | |
| SAT. # 7 | X | |
| SAT. # 8 | X | |
| SAT. # 9 | | X |
| SAT. #10 | | X |
| SAT. #11 | | X |
| SAT. #12 | | X |
| SAT. #13 | X | |
| SAT. #14 | X | |
| SAT. #15 | | |
| SAT. #16 | | |
| SAT. #17 | | |
| SAT. #18 | | |
| SAT. #19 | | |
| SAT. #20 | | |
| SAT. #21 | | |
| SAT. #22 | | |
| SAT. #23 | | |
| SAT. #24 | | |

ALTERNATE CULLED GPS SATELLITE INFORMATION

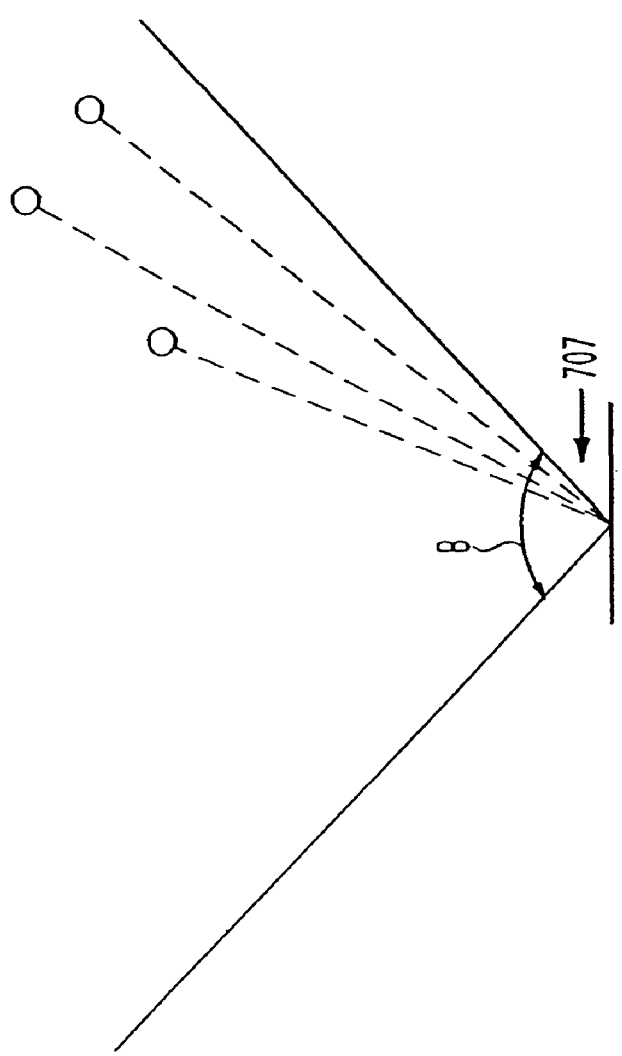
FIG. 7B(2)
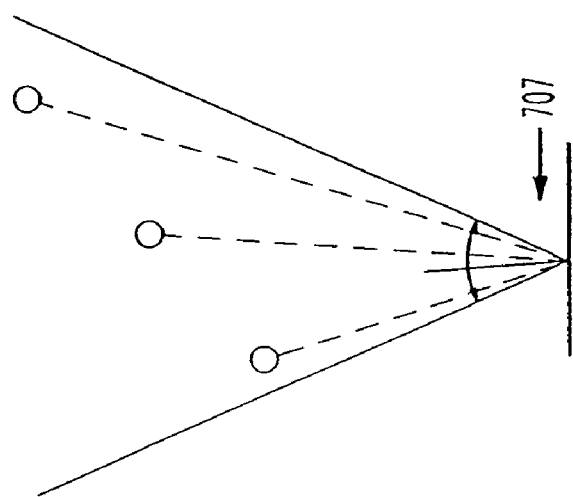
FIG. 7B(1)

/— 100C

| BASE STATION |
| --- |
| CULLED SAT. # 1, PRIM |
| CULLED SAT. # 2, PRIM |
| CULLED SAT. # 3, PRIM |
| CULLED SAT. # 4, PRIM |
| CULLED SAT. # 5, PRIM |
| CULLED SAT. # 6, SEC. |
| CULLED SAT. # 7, SEC. |
| CULLED SAT. # 8, SEC. |

CULLED LOCATING SATELLITE TABLE

| BASE STATION |
| --- |
| CULLED SAT. # 1, PRIM |
| CULLED SAT. # 2, PRIM |
| CULLED SAT. # 3, PRIM |
| CULLED SAT. # 4, PRIM |
| CULLED SAT. # 5, PRIM |
| CULLED SAT. # 6, SEC. |
| CULLED SAT. # 7, SEC. |
| CULLED SAT. # 8, SEC. |

CULLED LOCATING SATELLITE TABLE

| GPS SATELLITE ID | VISIBLE | CULLED | CULLED, PREFERRED |
|---|---|---|---|
| SAT. # 1 | | | |
| SAT. # 2 | | | |
| SAT. # 3 | | | |
| SAT. # 4 | | | |
| SAT. # 5 | | | |
| SAT. # 6 | X | | |
| SAT. # 7 | | X | |
| SAT. # 8 | | X | |
| SAT. # 9 | | | X |
| SAT. #10 | | | X |
| SAT. #11 | | | X |
| SAT. #12 | | | X |
| SAT. #13 | | X | |
| SAT. #14 | X | | |
| SAT. #15 | X | | |
| SAT. #16 | | | |
| SAT. #17 | | | |
| SAT. #18 | | | |
| SAT. #19 | | | |
| SAT. #20 | | | |
| SAT. #21 | | | |
| SAT. #22 | | | |
| SAT. #23 | | | |
| SAT. #24 | | | |

ALTERNATE CULLED LOCATING SATELLITE INFORMATION

CULLED SATELLITE EPHEMERIS INFORMATION FOR QUICK, ACCURATE ASSISTED LOCATING SATELLITE LOCATION DETERMINATION FOR CELL SITE ANTENNAS

This application is a continuation of U.S. application Ser. No. 11/503,272, entitled "Culled Satellite Ephemeris Information for Quick, Accurate Assisted Locating Satellite Location Determination for Cell Site Antennas," filed on Aug. 14, 2006 (abandoned after allowance to allow IDS in present application); which in turn is a continuation of U.S. application Ser. No. 11/342,837, entitled "Culled Satellite Ephemeris Information for Quick, Accurate Assisted Locating Satellite Location Determination for Cell Site Antennas," filed on Jan. 31, 2006, now U.S. Pat. No. 7,113,128, issued Sep. 26, 2006; which is a continuation of U.S. application Ser. No. 11/080,518, entitled "Culled Satellite Ephemeris Information for Quick, Accurate Assisted Locating Satellite Location Determination for Cell Site Antennas," filed on Mar. 16, 2005, now U.S. Pat. No. 7,019,690, issued Mar. 28, 2006; which claims priority from U.S. Provisional Application 60/618,606, entitled "Prioritized List of Potential Culled Satellite Ephemeris Information for Quick Accurate Assisted Locating Satellite Location Determination," filed Oct. 15, 2004 the entirety of all of which are expressly incorporated herein by reference.

BACKGROUND OF THE INVENTION

1. Field of the Invention

This invention relates generally to wireless and long distance carriers, Internet service providers (ISPs), and information content delivery services/providers and long distance carriers. More particularly, it relates to location services for the wireless industry.

2. Background of Related Art

It is desired to accurately locate cell phones within a cellular network. While there are several techniques for determining location in a mobile device, a future generation of mobile phones may include a global positioning satellite (GPS) receiver chipset, thus having the ability to locate itself via GPS.

FIG. 10 depicts the conventional Global Positioning Satellite system including about 24 or more GPS satellites.

In particular, as shown in FIG. 10, the earth 200 is surrounded by approximately 24 GPS satellites 101-124, which each have their own rotational orbit about the earth 200. There are currently about 24 to 27 GPS satellites in the GPS network, each moving about the earth approximately 6 times each day.

Unfortunately, as the phone moves about the country, locations with respect to satellites change. Thus, GPS devices attempting to determine their position with respect to the earth 200 will only be able to communicate with a smaller number of the total GPS satellites at any one time.

The time required for lock in and location determination by a conventional GPS receiver in determining which of the GPS satellites in the GPS network takes several minutes, and as many as 5 or 6 minutes for a standard GPS receiver, which is longer than many if not most phone calls.

There is a need for a less cumbersome and more efficient technique for using GPS location information in a highly mobile and fast paced society.

SUMMARY OF THE INVENTION

In accordance with one aspect of the present invention, a method and apparatus for culling a plurality of locating satellites into a sub-plurality for communication via a wireless base station, comprises defining an inverted cone above a reference point physically distant from a relevant mobile device. The plurality of locating satellites are culled to a culled group of locating satellites within the inverted cone above the reference point. An identity of the culled group of locating satellites is passed to the relevant mobile device.

BRIEF DESCRIPTION OF THE DRAWINGS

Features and advantages of the present invention will become apparent to those skilled in the art from the following description with reference to the drawings, in which:

FIG. 5 shows an alternate exemplary culled GPS satellite information table, in accordance with the principles of the present invention.

FIGS. 7A, 7B(1) and 7B(2) show adjustment of the computation of the arc that defines the inverted cone encompassing culled satellites as a function of latitude, or distance from the equator, in accordance with yet another embodiment of the present invention.

FIG. 9A(1) shows an exemplary culled locating satellite table including primary and secondary satellites, in accordance with an aspect of the present invention.

FIG. 9A(2) shows an alternative method of culling satellites by assigning a priority to each satellite within a given inverted cone, based on a remaining dwell time within the inverted cone, in accordance with another aspect of the present invention.

FIG. 9B shows an alternate exemplary culled locating satellite information table including visible, culled primary and secondary, and culled preferred (i.e., primary) locating satellites (e.g., GPS satellites), in accordance with yet another aspect of the present invention.

DETAILED DESCRIPTION OF ILLUSTRATIVE EMBODIMENTS

In a conventional GPS system, ephemeris data is provided to each GPS receiver to keep track of where each of the satellites in the GPS satellite network should be located in space. As part of the location determination process, each GPS receiver determines which of approximately 24 or more GPS satellites are to be used to determine GPS location. This determination requires a significant amount of real-time processing at the time of the location request, and a significant amount of time.

Figure 1:
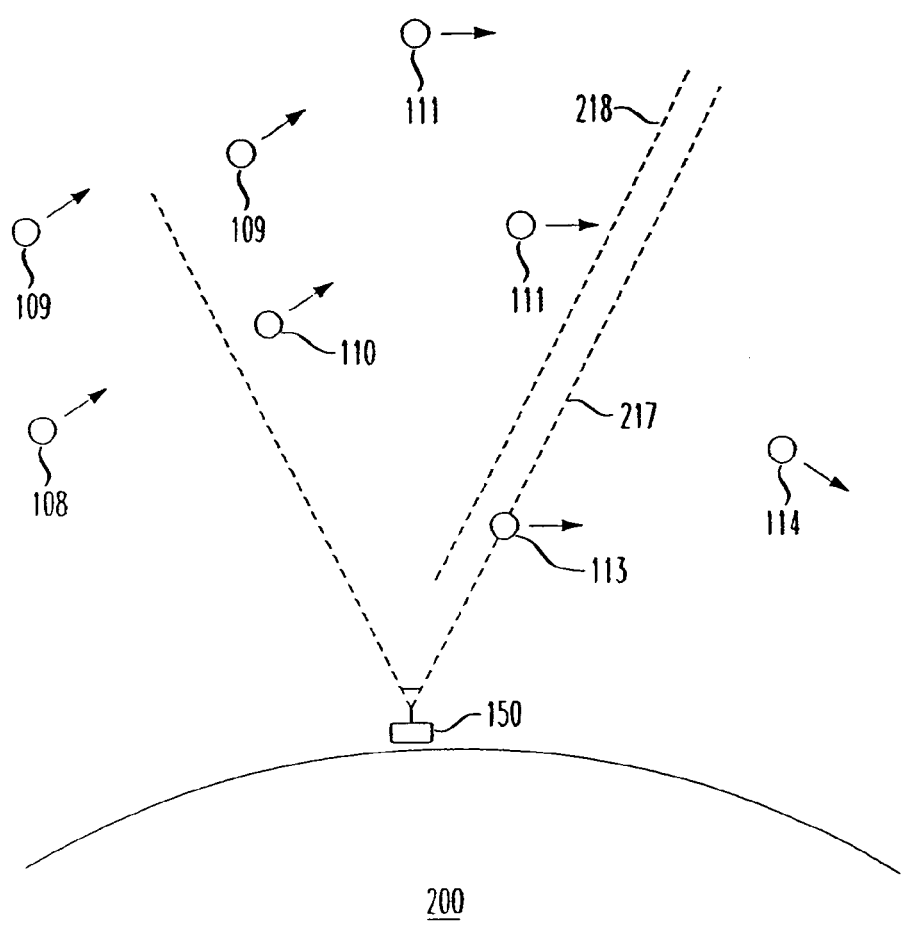
FIG. 1 shows a base station of a wireless network (e.g., a cellular telephone network) determining which GPS satellites are in a preferred group, e.g., being within a cone of space with the longest dwell time within that space, in accordance with the principles of the present invention.

FIG. 1 shows a base station 150 of a wireless network (e.g., a cellular telephone network) determining which GPS satellites 101-124 are in a preferred group, e.g., being within a cone of space 217 with the longest dwell time within that space, in accordance with the principles of the present invention.

In particular, as shown in FIG. 1, of the twenty four or so GPS satellites 101-124 in the GPS system, only a sub-set 107-114 are visible to the base station 150 at any one time. Thus, based on ephemeris data, the satellites communicating with a subscriber or user within a service range of the base station 150 may be culled to only those visible, e.g., GPS satellites 107-114.

As a further culling, only those GPS satellites 109-113 currently within a cone of space 217 above the relevant base station 150 might be selected for communication with a receiver or subscriber within the service area of the relevant base station 150.

As an ultimate culling, a minimum set of GPS satellites 109-112 may be selected based on, e.g., being not only within an arbitrary cone of space 217 normal to the base station 150, but also projected to remain within that cone of space 217 for the longest period of time, i.e., having the longest dwell time. Thus, GPS satellite 113 may be eliminated or culled from the minimum set of GPS satellites as it has almost completely passed through the cone of space 217, and will have the shortest dwell time of all GPS satellites within the cone of space 217.

Ideally, the cone of space 217 will be defined sufficiently large to contain at least four GPS satellites at any one time. Alternatively, if fewer than the minimum GPS satellites are within the cone of space 217, then alternative selection criteria may be employed until sufficient number of GPS satellites enter the cone of space 217. For instance, a GPS satellite being closest to the cone of space may be utilized.

Updated ephemeris data is typically transmitted for one GPS satellite each second. Thus, for a GPS network of, e.g., 24 satellites, updated ephemeris data for all GPS satellites will have been transmitted after 24 seconds. If the network is larger, e.g., 27 GPS satellites, all ephemeris data will be transmitted after 27 seconds. Preferably, the satellites will be periodically culled in accordance with the principles of the present invention based on the provision of updated ephemeris data, e.g., once every 24 seconds, once every 27 seconds, etc.

In accordance with the principles of the present invention, the total number of available GPS satellites 101-124 is centrally culled for each service location, e.g., for each base station. The culling may be graduated, e.g., for each base station. The culling may be graduated, e.g., first down to those GPS satellites 107-114 that are visible, and then down to a preferred minimum group (e.g., four (4) GPS satellites) having the longest dwell time for use by the particular cell site, or the culling may be to some desired number of satellites all of which are annotated with an order of precedence indicator with which the mobile device can tell which is best, which is second best, etc. Of course, the culling may simply cull to a desired level (e.g., to a minimum of three or four GPS satellites within the cone of space and having the longest dwell time) without graduation or indication of precedence.

When needed, the selected GPS satellites for a particular region at any particular time of request will be passed to requesting mobile devices to help it determine its own location. For instance, each operative mobile unit is preferably periodically updated with a revised list of selected GPS satellites resulting from the culling of the GPS satellites, e.g., once after each new updated culled list of satellites is determined. The information provided to each subscriber upon request preferably contains the identity of those GPS satellites that are selected for communication. However, information provided in the reverse sense is also within the scope of the present invention (e.g., a list of GPS satellites NOT to communicate with).

A wireless network may generate a flush of updated culled GPS satellite information periodically, e.g., every 24 seconds. Note that based on the positions of the various GPS satellites 101-124, and in particular based on the positions of the selected GPS satellites 109-112 within the cone of space 217, the list of selected GPS satellites may or may not change.

Preferably, network traffic will be minimized by reducing or eliminating redundant GPS satellite information. Thus, in a preferred embodiment, GPS satellite list updating messages are sent only when a change in the list has occurred.

Figure 2:
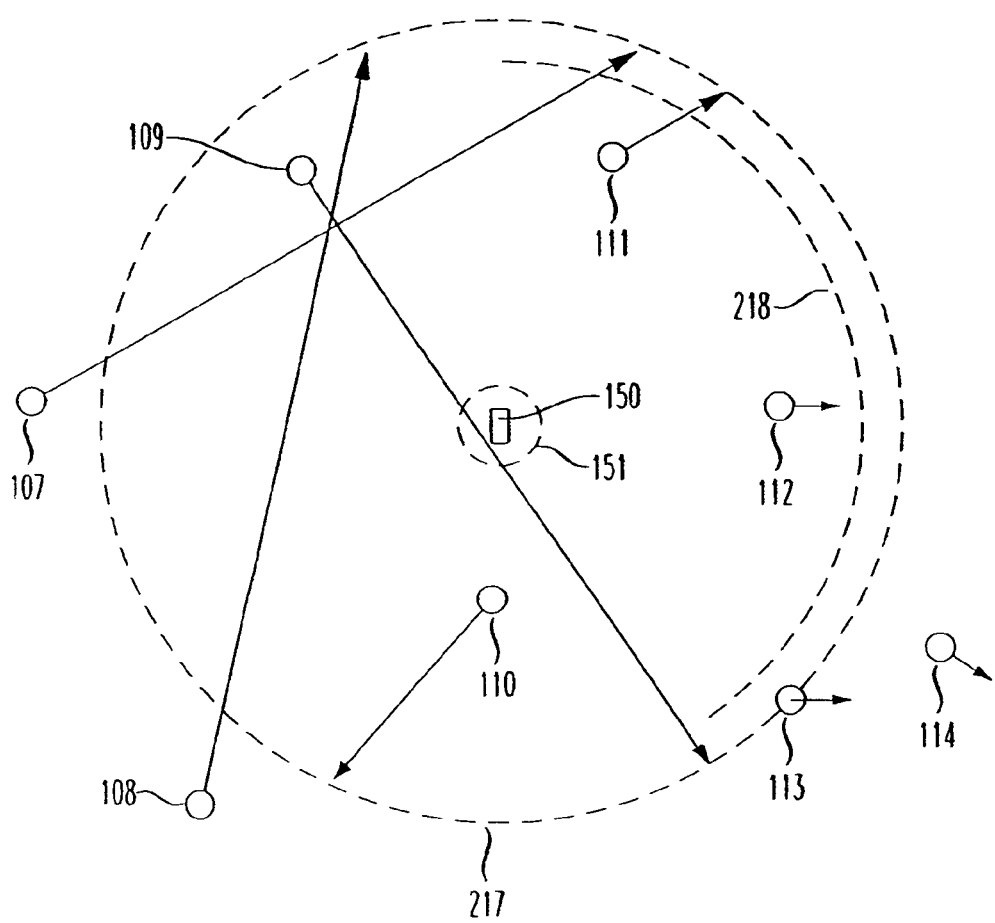
FIG. 2 shows a top view of the cone of space as shown in FIG. 1.

FIG. 2 shows a top view of the cone of space 217 as shown in FIG. 1.

In particular, as shown in FIG. 2, a cone of space 217 is viewed from space normal to a base station 150. On the ground, the base station 150 has a service region 151. The circular representation of the cone represents a plane cut across the cone of space 217.

Within the cone of space 217, GPS satellites 101-124 generally travel from one side to the other. Dwell time is determined based on a distance between the present location of the particular GPS satellite, and the exit edge of the cone of space 217, as well as the rate of speed of the GPS satellite.

A minimum dwell time may be defined and represented as a edge 218 shown in FIGS. 1 and 2.

A satellite velocity vector may be determined or predetermined. Satellite velocity vector as used herein refers to a vector whose magnitude is the velocity of the satellite and whose origin is the satellite's current position.

The satellite's velocity vector may be derived from the ephemeris data describing the satellite's orbit and current position. The satellite's velocity vector provides the satellite's velocity and direction of travel. The satellite's velocity and direction are used to compute the point of intersection of the satellite's orbit and the edge of the cone of visibility 217.

This computed point of intersection along the satellite's orbit defines the endpoint of an ellipsoid arc from the satellite's current position to the point of intersection. The satellite's velocity and orbital parameters-provided by ephemeris data-can be used to compute the time it will take the satellite to traverse that ellipsoid arc. This time value constitutes the satellite's dwell time within the cone of visibility.

It should be noted that GPS satellites have many different orbits, and almost never travel in precisely the same direction as other GPS satellites, as depicted by the various directions of the velocity vectors shown in FIG. 2.

In accordance with the principles of the present invention, a small group of GPS satellites with the longest "cone" dwell times will be selected and some of the other GPS satellites will be "culled". The longest dwell time relates to the amount of time that a calculated GPS satellite vector will be within a respective cone of space 217 above a particular region of users, e.g., above a particular base station 150.

The cone of space 217 may be simply a cone of visibility above the base station 150, or may be more narrowly defined than visibility.

The resultant list of selected GPS satellites is preferably periodically and continually updated for any particular location, e.g., base station 150, as the GPS satellites 101-124 rotate about the earth. Updated selected GPS satellite lists are preferably communicated to the subscriber's mobile device (or other suitable application location) for their respective calculations of accurate location information. With the use of selected GPS satellites only by culling out unnecessary or unseen GPS satellites, the total time required for a mobile phone to locate itself can be reduced significantly, e.g., from minutes to just seconds.

Figure 3:
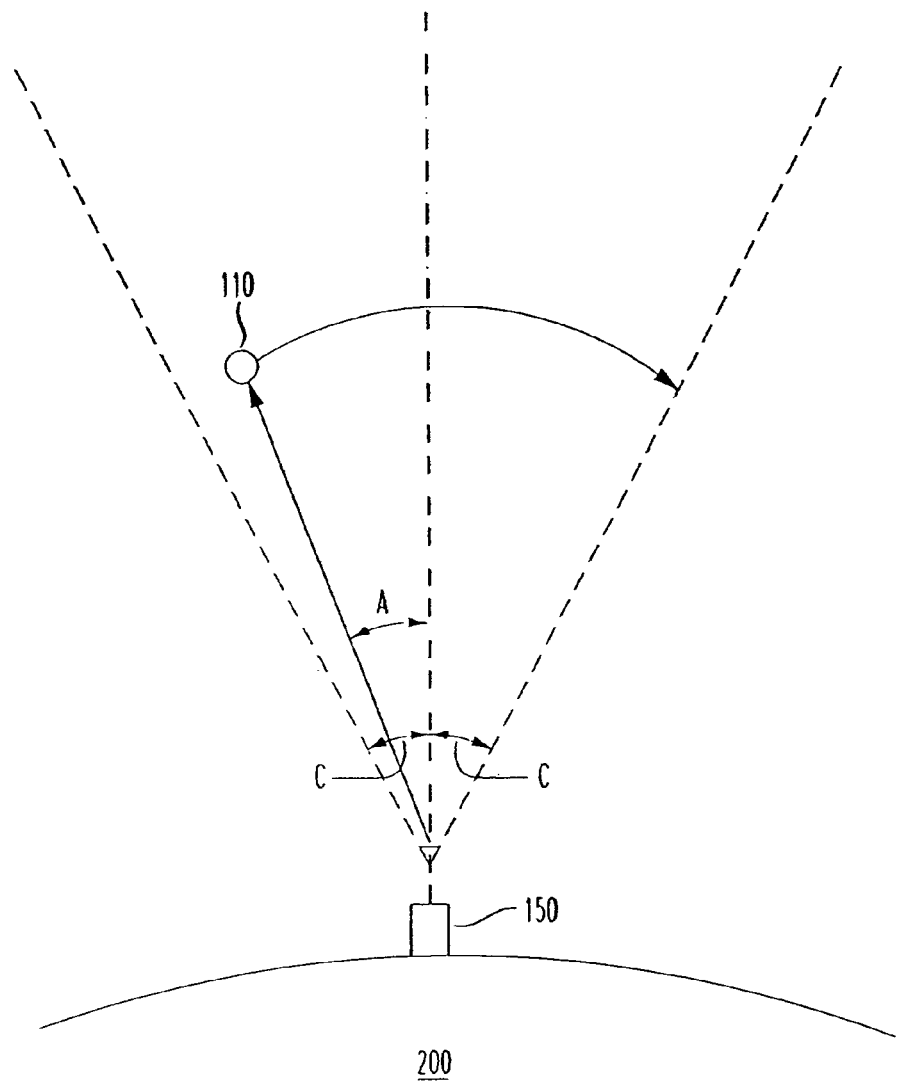
FIG. 3 shows vector calculations for each GPS satellite, or for each of a preferred set of GPS satellites (e.g., those visible to the base station), in accordance with the principles of the present invention.

FIG. 3 shows vector calculations for each GPS satellite 101-124, or for each of a preferred set of GPS satellites (e.g., those visible to the base station), in accordance with the principles of the present invention.

In particular, as shown in FIG. 3, conventional GPS ephemeris data is formatted as RINEX 2.10 data, which is provided by conventional GPS ephemeris data vendors to a Gateway Mobile Location Center (GMLC) and/or mobile position center (MPC). In the preferred embodiment, a Xypoint Location Platform (XLP) was used. In accordance with the principles of the present invention, received RINEX data is converted into an Earth Center (EC) position vector (i.e., a vector pointing to the satellite's current position whose origin is the center of the Earth). Then, using the Earth Center position vectors, the available GPS satellites are culled such that only desired GPS satellites are communicated with (i.e., those that will be in the cone of space 217 the longest).

In the disclosed embodiments, an Earth Center position vector is computed (or pre-computed) for every cell site 150 in a cellular network. The cell site's EC position vector can be subtracted from the GPS satellite's EC position vector to arrive at a vector that points from the cell site 150 to the particular GPS satellite 101-124. The resulting vector can be divided by its own magnitude to generate a unit vector that points from cell site 150 toward the particular GPS satellite 101-124. The cell site's EC position vector can similarly be divided by its own magnitude to generate a unit vector that points straight up from the cell site 150 (also pre-computed).

The dot product of the GPS satellite pointing unit vector and the vertical unit vector yields the cosine of the angle between the two vectors. The cosine of an angle of zero degrees yields the value 1.0. The resulting value of the equation "cosine (angle)" diminishes as the angle grows until the cosine of 90 degrees yields the value 0.0. The cosine of angles greater than 90 degrees yield negative results. This makes the cosine of the angle between the satellite pointing unit vector and the vertical unit vector particularly well suited for identifying whether or not the satellite is "visible". An angular measurement defining a cone of space above the cell site (e.g., a "cone of visibility") can be pre-computed as a function of the latitude at which the cell site is located. The cosine of this latitude derived angle can be saved. Any satellite whose dot product with the vertical unit vector yields a value greater than or equal to the saved cosine reference value can then be considered "visible".

Thus, a rough culling of GPS satellites 101-124, e.g., to only those visible, or even better yet to only those most normal to a base station 150, certainly culling out all GPS satellites that aren't visible at all, and reducing the number of GPS satellites with which to communicate to some small number, each of which is annotated with its order of precedence. This helps keep the time needed to determine location short by providing "backup" satellites with which to communicate just in case local topography blocks the signal from a satellite with a longer dwell time (e.g., a satellite with a lower "order of precedence" value).

Figure 4:
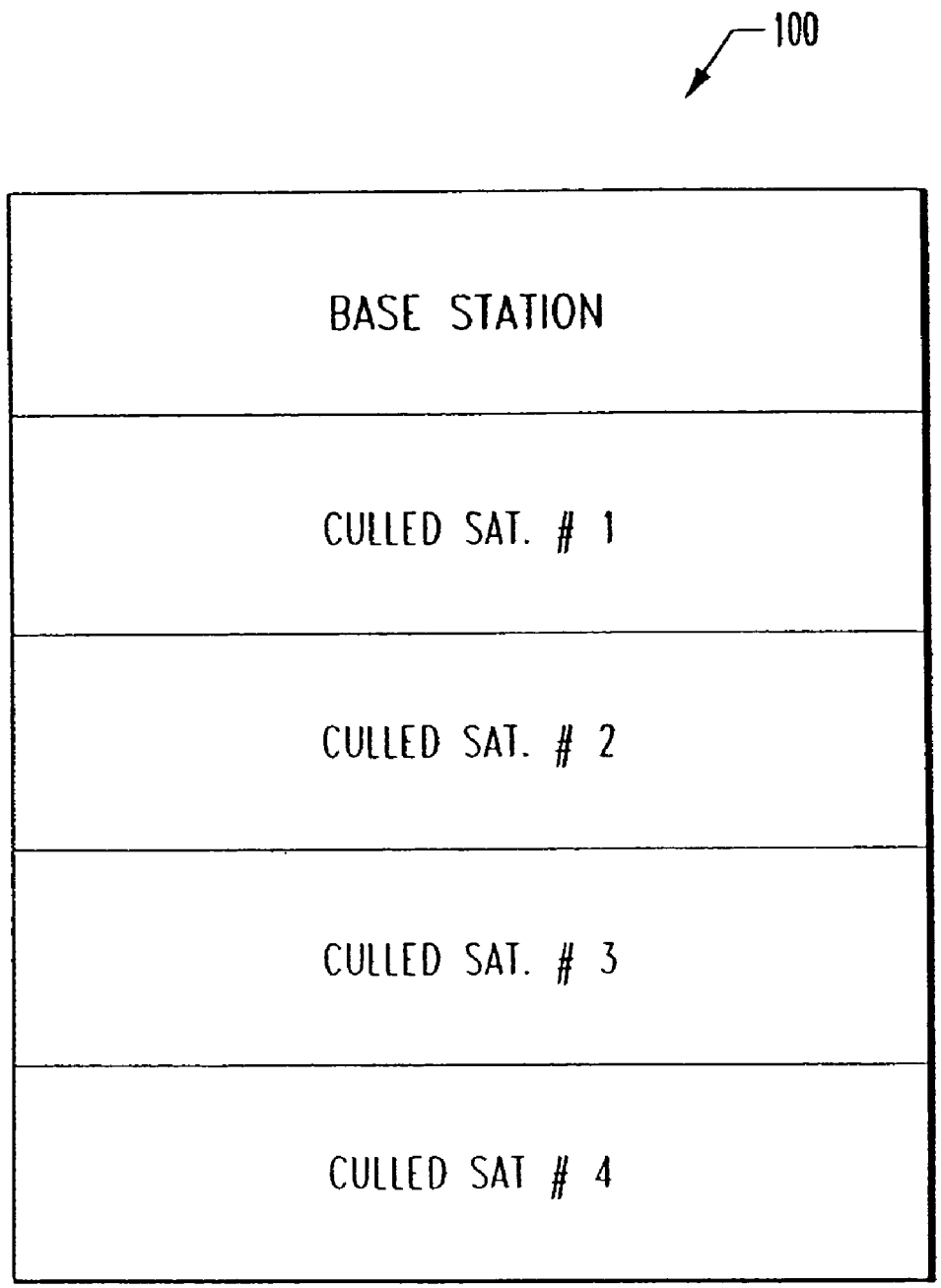
FIG. 4 shows an exemplary culled GPS satellite table, in accordance with the principles of the present invention.

FIG. 4 shows an exemplary culled GPS satellite table 100, in accordance with the principles of the present invention.

In particular, as shown in FIG. 4, the selected group of satellites for any particular cell site may be maintained in a suitable database and/or other table 100, which may then be provided upon request to any particular mobile device within the service area of that particular cell site 150.

Thus, a small subgroup of GPS satellites having the longest dwell time with respect to a servicing cell site 150 are selected, and maintained in a culled satellite table 100 communicated to all active mobile subscribers (or other grouping of mobile users). Moreover, or alternatively, whenever a mobile device requires ephemeris data, it may request an update to a culled satellite table 100 containing the identity of the preferred satellites with which to use to determine location of the mobile device.

FIG. 5 shows an alternate example of a selected or culled GPS satellite information table, in accordance with the principles of the present invention.

In particular, as shown in FIG. 5, a database or table 100*b* may include information regarding all or most GPS satellites 101-124, with those that are selected for any particular base station 150 being appropriately indicated.

While the present invention is explained with reference to the use of as few as three (3) or four (4) and as many as 24 or 27 available satellites 101-124, the present invention relates to the use of any number less than all GPS satellites.

Moreover, while the present invention provides culling of visible satellites, and even to a minimum number of satellites, e.g., down to four from those visible satellites, the resultant number of satellites may be a number greater than or even less than 4, within the principles of the present invention. For instance, if only position is required, only three (3) GPS satellites are required. However, if altitude is also required, four (4) GPS satellites are the minimum required and thus the maximum culling level. Moreover, the use of more than approximately six (6) GPS satellites do not significantly improve the accuracy of the results.

If a mobile device is unable for some reason to communicate with one or more GPS satellites directed by the culled GPS satellite table or similar information, the mobile device may then attempt to achieve location information in an otherwise conventional manner, e.g., by attempting contact with all GPS satellites.

The core technology of culling locating satellites to a subplurality is disclosed in U.S. Pat. No. 6,650,288, co-owned with the present application. The following sets forth several significant advances to that core technology.

1) Compute Satellite Dwell Time Based on Ellipsoid Arc

Figure 6A:
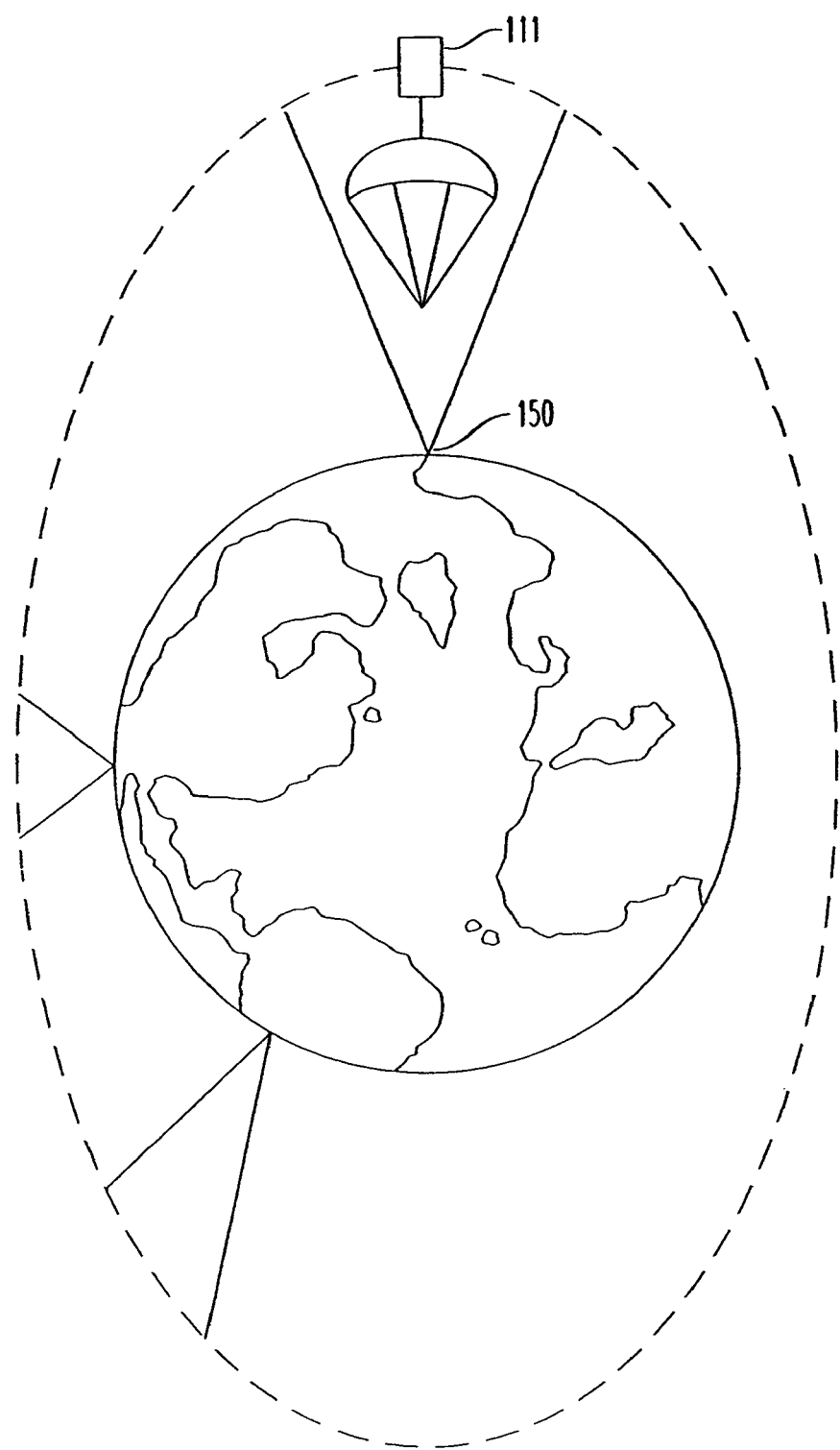
FIGS. 6A and 6B show use of the calculation of an ellipsoid arc path actually traveled by each satellite to determine more accurately the length of time a locating satellite is within range of a particular location, in accordance with another embodiment of the present invention.
Figure 6B:
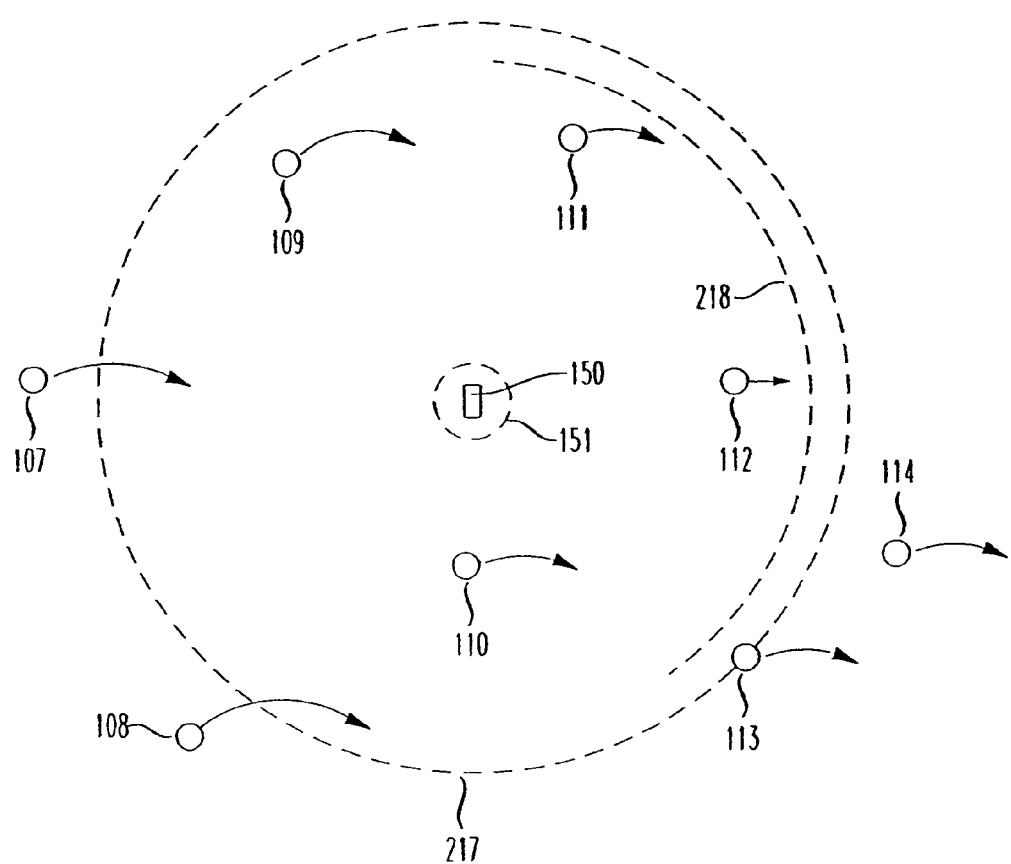

FIGS. 6A and 6B show use of the calculation of an ellipsoid arc path actually traveled by each satellite to determine more accurately the length of time a locating satellite is within range of a particular location, in accordance with another embodiment of the present invention.

In particular, as described above, a satellite's path may be projected onto a plane that, cutting through the inverted cone over a reference point, forms a circle. As described, the satellite's speed could be used to approximate the satellite's dwell time within the cone. This is a simple function of computing the amount of time it would take the satellite to traverse the chord cutting across the circle as if it were actually traveling in a straight line.

However, a straight line in the plane cutting across the inverted cone would be an approximation. The satellite isn't actually traveling in a straight line, but rather in an ellipsoid arc.

In accordance with this embodiment, the dwell time is computed using the satellite's actual ellipsoid arc, as well as the position of the satellite with respect to the Earth (i.e., whether the satellite's altitude is increasing or decreasing) to improve the selection process.

As shown in FIG. 6A, the orbit of a locating satellite is typically elliptical. The depiction in FIG. 6A is somewhat exaggerated in ellipticity for ease of explanation. In the orbit, the point(s) at which the locating satellite is farthest from Earth is called the apogee of the orbit, while the point(s) at which the locating satellite is closest to the Earth is called the perigee of the orbit.

The present embodiment appreciates two aspects of the calculation of satellite dwell time that are not detailed in the prior art: the ellipsoid arc path of the locating satellite through the inverted cone (as depicted in FIG. 6B), and the fact that the acceleration of the locating satellite is decreasing as it moves on its orbit beyond perigee but toward apogee, causing a decrease in the speed of the locating satellite with respect to the Earth. As the locating satellite moves in its orbit between apogee and perigee, the gravitational pull of the Earth causes an increasing acceleration, and thus an increasing speed.

The math involved in calculating the ellipsoid art passing through any given cross section of any given inverted cone (e.g., as shown in FIG. 6B) is conventional, as is calculations of the acceleration and speed of the locating satellite on any given point of its orbit. It is the recognition and application of the actual path of the locating satellite as well as its actual speed, rather than use of a straight line approximation, that is important to the principles of the present embodiment of the invention.

2) Compute the Arc that Defines the Inverted Cone as a Function of Latitude

Figure 7A:
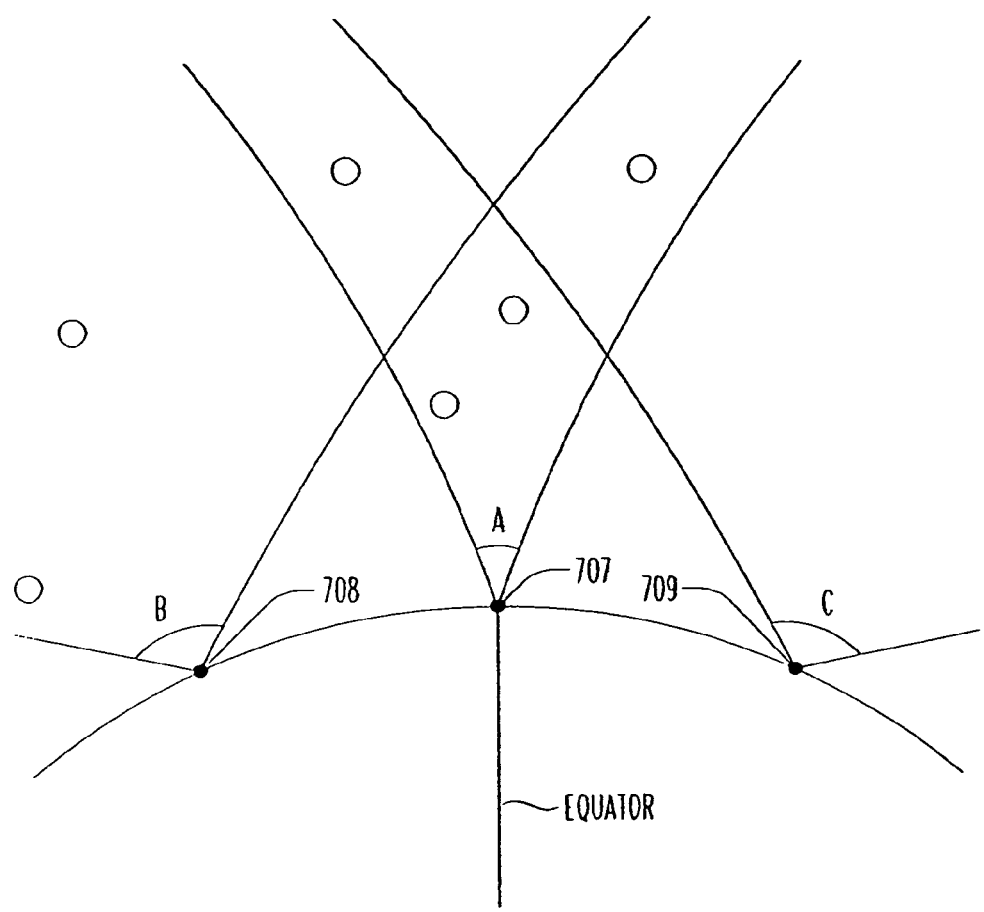

FIGS. 7A, 7B(1) and 7B(2) show adjustment of the computation of the arc that defines the inverted cone encompassing culled satellites as a function of latitude, or distance from the equator, in accordance with yet another embodiment of the present invention.

In particular, as described above, an angle may be defined that ultimately defines a cone above the reference point. In accordance with yet another embodiment, that angle defining the cone may be selected or computed as a function of the reference point's latitude.

FIG. 7A depicts a cross-sectional view of Earth, with an imaginary base station 707 located longitudinally on the equator. The angle A at the base of the inverted cone defining locating satellites within view is at a minimum.

The present embodiment establishes inverted cones with a larger angle (B and C, respectively) as compared to the angle A of the inverted cone at the equator. In this embodiment, the larger angles B, C of the inverted cones are established to be in a relationship to the latitude (e.g., the distance from the equator of the Earth) of the relevant base station.

Thus, the closer the relevant base station is to the equator, the more likely it is that a sufficient number of locating satellites will be visible (e.g., 4 satellites visible). The farther the relevant base station is from the equator, the fewer number of locating satellites would be visible within a same inverted cone.

Stated differently, the present embodiment establishes an inverted cone having a larger base angle at a base station farther from the equator to encompass the same number of preferred or minimum culled locating satellites as would a base station located more closely to the equator. This is depicted in FIGS. 7B(1) and 7B(2).

In particular, FIG. 7B(1) shows a cross section of the inverted cone established to define the culling of locating satellites for a base station 707. The base angle of the inverted cone has an angle A.

In comparison, as shown in FIG. 7B(2), a cross section of the inverted cone established to define the culling of locating satellites for a base station 708 located farther from the equator than was base station 707 shown in FIG. 7B(1). As depicted, at or near the equator the distribution of satellites within the cone of visibility will likely be fairly uniform. However, in locations significantly away from the equator, the distribution of visible satellites within the cone of visibility look tend to be nearer to one boundary or the other, depending on which hemisphere), rather than being uniformly distributed throughout the inverted cone. Thus, as shown in FIG. 7B(2), in a location away from the equator, the visible satellites tend to favor the edge of the inverted cone closest to the equator.

The present embodiment also appreciates that received signal strength from the locating satellites is best when the locating satellite is directly overhead of the base station (i.e., normal to the Earth at the location of the base station). Thus, the inverted cone of 'visible' locating satellites is made narrower when the base station is closer to the equator of the Earth, and made larger when the base station is farther from the equator of the Earth.

Thus, as appreciated by the present inventors, there are benefits to limiting the span of the inverted cone if one's latitude doesn't force a wider span just to see the GPS satellites.

3) Utilization of Cell Site Antennas as Reference Points

Figure 8:
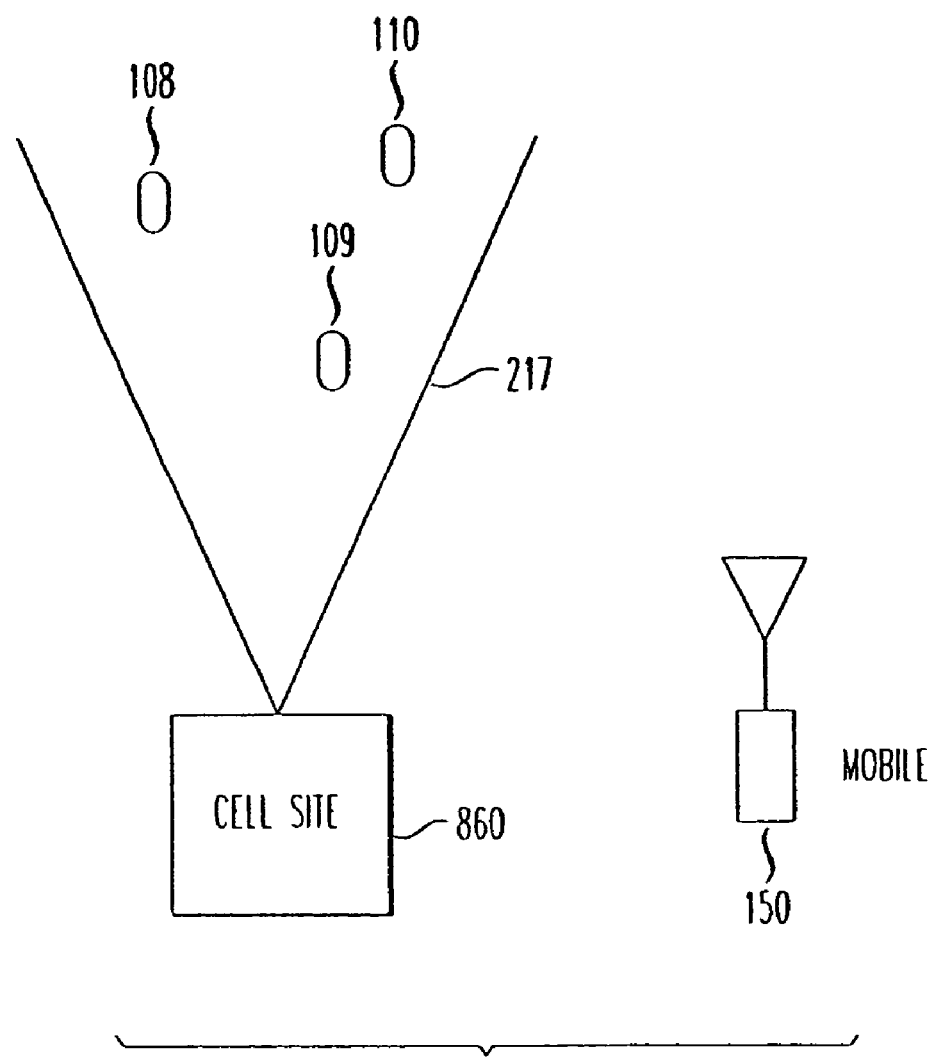
FIG. 8 shows the utilization of wireless communication system cell cites as reference points, in accordance with a further embodiment of the present invention.
Figure 10:
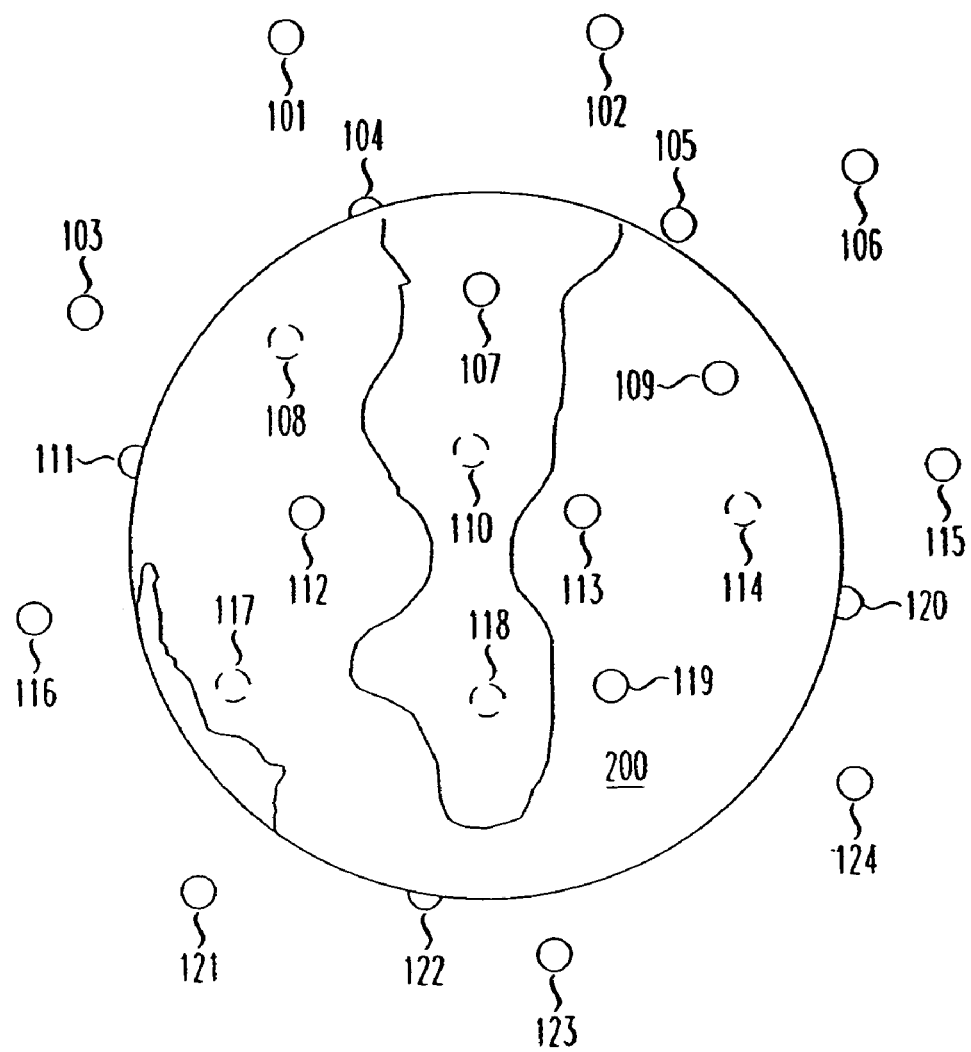
FIG. 10 depicts the conventional Global Positioning Satellite system including about 24 or more GPS satellites.

The embodiments thus far relate to the definition of a full inverted cone above a base station 150 (e.g., having 360 degree coverage). FIG. 8 shows the utilization of reference points for locating satellites, in accordance with a further embodiment of the present invention.

In particular, an inverted cone 217 is computed above given 'reference points' as an estimate for an inverted cone above the relevant wireless device 150. In accordance with a further embodiment, the reference point may be a wireless communications cell site 860 (e.g., cell phone base station antennas). Thus, cell sites 860 may be specifically used as reference points for culling the ephemeris information used to expedite Assisted GPS location determinations.

In order to enable the mobile handsets (i.e., cell phones, wireless enabled PDAs, etc.) to quickly locate themselves, it is desired to provide them with a good indication of with which satellites to communicate.

To give the handset the subset of satellites it should communicate with, a rough idea as to the location of all satellites is required. Such a rough idea allows the choice of a subset of the satellites that have a very high probability of being visible to the handset.

The parent patent (U.S. Pat. No. 6,650,288) refers to the "rough" or "approximate" positions as "reference points". However, in accordance with this aspect of the invention, it is possible to use any point at all, as long as one is chosen that is easily and quickly picked, and that is also fairly close to the mobile handset.

Cell sites are particularly well suited for use as reference points for cellular phones because every mobile handset must communicate with a cell site in order to do even basic wireless functions, and all the cell sites have been surveyed such that their locations are known. Surveying the cell sites was necessary in the U.S. in order to provide Phase One (i.e. imprecise) location for enhanced 911 support so that data is readily available. Though Asia's and Europe's Emergency Services mandates are different than that of the United States, the cell sites in those areas are also surveyed so their locations are also available.

Since cellular phones connect to carrier's networks through cell sites, there is very little additional time necessary to use that cell site's location as a rough approximation of the handset's location for the purposes of choosing a subset of locating satellites.

In some cases, a cell site may have several sectors but be represented by only one location. In other cases, a cell site may represent only one receiver of a collection of receivers (see FIG. 8). In either case, the mobile handset will be communicating with one and only one of the cell sites, and that cell site will have a surveyed location that will quite nicely approximate the handset's location for the purposes of selecting a subset of locating satellites.

4) Provide More Than Four (4) Satellite's Ephemeris Data with an Order of Precedence Indication As described above, it is preferred that no more than four (4) satellite's ephemeris data would be delivered to a wireless handset. In this way, using too much Radio Frequency (RF) bandwidth is avoided, while providing the data necessary to achieve a good GPS fix for latitude, longitude, and altitude too.

Sometimes, more than just four (4) satellite's data is sent to the handset. Sometimes this is done so that the handset can perform its own satellite selection. Sometimes this is done to provide a fallback in case a particular handset is masked and cannot receive the signal of one or more of the primary selections.

FIGS. 9A(1), 9A(2) and 9B show the use of more than 4 culled satellites, providing the identities of additional satellites for the wireless device to use as backup satellites as necessary (e.g., when a culled, preferred satellite is masked and the wireless device cannot receive the signal of that primary selection), in accordance with still another embodiment of the present invention. Thus, a number 'N' ('N' being greater than 1 or 2 or 4 or whatever) of locating satellite's ephemeris data may be used, along with a preferred 'order of precedence', allowing a mobile device to use the desired minimum number of locating satellites (e.g., four (4) locating satellites) if available, but could fall back as necessary to the use of other locating satellites that are visible but still favorable.

FIG. 9A(1) shows an exemplary culled locating satellite table including a list of a preferred number of primary satellites (e.g., 4 preferred satellites). Additionally, the exemplary culled locating satellite table includes an identification of at least one or more secondary locating satellites.

Preferably, a priority is given to each of the secondary locating satellites such that the relevant mobile device will, as necessary, attempt to receive a signal from each of the secondary locating satellites in the prioritized order.

The mobile device may, depending upon the particular application, attempt contact with all secondary, tertiary, etc. locating satellites listed in the culled locating satellites table 100c. However, it is more preferable, to save network resources and time, that once a sufficient number of locating satellites have been achieved, the need to contact additional locating satellites becomes unnecessary and may be abandoned for that particular locating session.

FIG. 9A(2) shows an alternative method of culling satellites by assigning a priority to each satellite within a given single inverted cone, based on a remaining dwell time within the inverted cone, in accordance with another aspect of the present invention.

In particular, all dwell times are simply computed (i.e., durations within the inverted cone of visibility defined over a particular reference point), and then pick 'N' number of satellites. The number of satellites picked may be, e.g., five, or six, or nine, or twelve, or whatever, so long as there are more satellites picked then are necessary to determine location as desired.

These 'N' satellites are then annotated with an integer precedence value. The satellite with the longest dwell time would be annotated with a precedence value of '1'. The satellite with the second longest dwell time would be annotated with a precedence value of '2'. This would give the mobile handsets an easy indication as to which satellites to limit their position determination, and which satellites to attempt to utilize first, second, third, etc.

The assignment of precedence to satellites allows a mobile handset a viable fallback should one of the preferred four (4) satellites be temporarily obscured while attempting to determine the handset's location. In this case, the handset would timeout while attempting to receive one (or more) of the preferred satellites' signal, and simply move to the satellite in the list with the next lowest precedence indicator.

FIG. 9B shows an alternate exemplary culled locating satellite information table including visible, culled primary and secondary, and culled preferred (i.e., primary) GPS satellites, in accordance with yet another aspect of the present invention. Thus, a complete picture of all locating satellites that the relevant mobile device may possibly receive a locating signal from is provided to the mobile device, allowing the mobile device itself decide which locating satellites are to be communicated with, and in what order.

While the invention has been described with reference to the exemplary embodiments thereof, those skilled in the art will be able to make various modifications to the described embodiments of the invention without departing from the true spirit and scope of the invention.

What is claimed is:

1. A method of culling a plurality of locating satellites into a sub-plurality for communication, comprising:
    defining a geometric shape above a reference point physically distant from a relevant mobile device;
    defining a first group of satellites having a higher priority for determining a location of said relevant mobile device;
    defining a second group of satellites having a lower priority for determining a location of said relevant mobile device relative to said higher priority; and
    culling said plurality of locating satellites to a culled group of locating satellites comprising said first group of satellites and said second group of satellites within said geometric shape defined above said reference point, said culled group being determined based on a dwell time within said geometric shape.

2. The method of culling a plurality of locating satellites into a sub-plurality for communication according to claim 1, wherein:
    said geometric shape has an apex corresponding to said reference point.

3. The method of culling a plurality of locating satellites into a sub-plurality for communication according to claim 1, wherein:
    said geometric shape is a conic solid.

4. The method of culling a plurality of locating satellites into a sub-plurality for communication according to claim 3, wherein:
    said geometric shape has an apex corresponding to said reference point.

5. The method of culling a plurality of locating satellites into a sub-plurality for communication according to claim 4, wherein:
    said conic solid is a right cone.

6. The method of culling a plurality of locating satellites into a sub-plurality for communication according to claim 5, wherein:
said conic solid is a right circular cone.

7. The method of culling a plurality of locating satellites into a sub-plurality for communication according to claim 1, wherein:
said reference point corresponds to a wireless base station.

8. The method of culling a plurality of locating satellites into a sub-plurality for communication according to claim 1, wherein:
said reference point corresponds to a surveyed location of a cellular cell site which may be a site of an antenna or a cluster of antennae.

9. The method of culling a plurality of locating satellites into a sub-plurality for communication according to claim 1, wherein:
said wireless base station is a cellular phone base station.

10. The method of culling a plurality of locating satellites into a sub-plurality for communication according to claim 1, wherein:
said culling is performed by said mobile device.

11. The method of culling a plurality of locating satellites into a sub-plurality for communication according to claim 1, wherein:
said culling is performed by a wireless base station with which said mobile device is in communication.

12. The method of culling a plurality of locating satellites into a sub-plurality for communication according to claim 1, wherein each of said plurality of locating satellites comprise:
a Global Positioning Satellite (GPS).

13. The method of culling a plurality of locating satellites into a sub-plurality for communication according to claim 1, wherein:
satellites within said second group of satellites are prioritized.

14. Apparatus for culling a plurality of locating satellites into a sub-plurality for communication, comprising:
means for defining a geometric shape above a reference point physically distant from a relevant mobile device;
means for defining a first group of satellites having a higher priority for determining a location of said relevant mobile device;
means for defining a second group of satellites having a lower priority for determining a location of said relevant mobile device relative to said higher priority; and
means for culling said plurality of locating satellites to a culled group of locating satellites comprising said first group of satellites and said second group of satellites within said geometric shape defined above said reference point, said culled group being determined based on a dwell time within said geometric shape.

15. The apparatus for culling a plurality of locating satellites into a sub-plurality for communication according to claim 14, wherein:
said geometric shape has an apex corresponding to said reference point.

16. The apparatus for culling a plurality of locating satellites into a sub-plurality for communication according to claim 14, wherein:
said geometric shape is a conic solid.

17. The apparatus for culling a plurality of locating satellites into a sub-plurality for communication according to claim 16, wherein:
said geometric shape has an apex corresponding to said reference point.

18. The apparatus for culling a plurality of locating satellites into a sub-plurality for communication according to claim 17, wherein:
said conic solid is a right cone.

19. The apparatus for culling a plurality of locating satellites into a sub-plurality for communication according to claim 18, wherein:
said conic solid is a right circular cone.

20. The apparatus for culling a plurality of locating satellites into a sub-plurality for communication according to claim 14, wherein:
said reference point corresponds to a wireless base station.

21. The apparatus for culling a plurality of locating satellites into a sub-plurality for communication according to claim 14, wherein:
said reference point corresponds to a surveyed location of a cellular cell site which may be a site of an antenna or a cluster of antennae.

22. The apparatus for culling a plurality of locating satellites into a sub-plurality for communication according to claim 20, wherein:
said wireless base station is a cellular phone base station.

23. The apparatus for culling a plurality of locating satellites into a sub-plurality for communication according to claim 14, wherein:
said culling is performed by said mobile device.

24. The apparatus for culling a plurality of locating satellites into a sub-plurality for communication according to claim 14, wherein:
said culling is performed by a wireless base station with which said mobile device is in communication.

25. The apparatus for culling a plurality of locating satellites into a sub-plurality for communication according to claim 14, wherein each of said plurality of locating satellites comprise:
a Global Positioning Satellite (GPS).

26. The apparatus for culling a plurality of locating satellites into a sub-plurality for communication according to claim 14, wherein:
satellites within said second group of satellites are prioritized.

27. A method of culling a plurality of locating satellites into a sub-plurality for communication, comprising:
defining a geometric shape having an apex above a reference point physically distant from a relevant mobile device;
culling said plurality of locating satellites to a culled group of locating satellites within said geometric shape defined above said reference point, said culled group being determined based on a dwell time within said geometric shape; and
passing an identity of said culled group of locating satellites to said relevant mobile device.

* * * * *